Patented Dec. 30, 1930

1,786,611

UNITED STATES PATENT OFFICE

WILTON C. HARDEN, OF BALTIMORE, MARYLAND, ASSIGNOR, BY MESNE ASSIGNMENTS, TO HYNSON, WESTCOTT & DUNNING, INC., OF BALTIMORE, MARYLAND, A CORPORATION OF MARYLAND

HALOGENATED SULPHONE PHTHALEINS

No Drawing.  Application filed April 4, 1928.  Serial No. 267,473.

This invention relates to new halogenated sulphone phthaleins in which the halogen is present in the sulpho-benzoic acid nucleus or in both the sulpho-benzoic acid and phenolic nuclei, and to processes for preparing the same. The new compounds may be represented by the following formula:

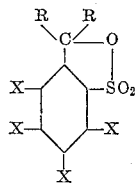

in which R stands for a residue of a phenol, for example, phenol, resorcinol, a cresol, thymol or a halogenated phenol, and X stands for hydrogen, chlorine, bromine or iodine, at least one X being halogen.

More specifically the invention relates to the preparation of di- or tetra-halogenated sulphone phthaleins in which the halogens are present in the sulpho-benzoic acid nucleus and di- or tetra-halogenated phenol di- or tetra-halogenated sulphone phthaleins in which the halogens are present in both the sulpho-benzoic acid and phenolic nuclei.

Halogenated sulphone phthaleins containing halogen in the sulpho-benzoic acid nucleus may in general be prepared by condensing a halogenated ortho-sulpho-benzoic acid or anhydride with a phenol. Any of the halogenated ortho-sulpho-benzoic acids and anhydrides including the mono-, di-, tri- and tetra-, chloro-, bromo-, and iodo-o-sulpho-benzoic acids and their anhydrides described in an application of Daniel Twiss, Serial No. 267,483, filed of even date herewith, may be condensed in this manner.

For example, di- and tetra-halogenated sulphone phthaleins and their analogs can be prepared by condensing di- or tetra-halogenated ortho-sulpho-benzoic acids or the corresponding anhydrides with various phenols and substituted phenols at temperatures in the neighborhood of 120° to 170° C. The di- and tetra-halogenated ortho-sulpho-benzoic acids are prepared by halogenation of ortho-sulpho-benzoic acid, its anhydride, or its acid ammonium salt, in fuming sulphuric acid, at temperatures between 60–170° C. The condensations are brought about with or without the use of a condensing agent such as, for example, $SnCl_4$, $ZnCl_2$, $H_2SO_4$, etc., the conditions depending upon the phenols used. Examples of phenols which have been condensed in this manner are the following: phenol, resorcinol, cresols, and various substituted phenols such as o-chloro-phenol and o-bromo-phenol. In the case of o-halogenated phenols the resulting condensation product is a di-halogenated phenol di- or tetra-halogenated sulphone phthalein, that is, the halogens are present in the phenolic nuclei as well as in the sulphone phthalein nucleus.

Another method of preparing halogenated sulphone phthaleins containing halogen in the phenolic nuclei, as well as in the sulphone phthalein nucleus, consists in the direct halogenation of a halogenated sulphone phthalein which contains halogen in the sulpho-benzoic acid nucleus.

The following examples illustrate the types of compounds which may be prepared in accordance with this invention, but it is to be understood that the invention is not limited to the particular compounds recited except as required by the scope of the appended claims.

*Example I.*—Preparation of phenol tetra-brom sulphone phthalein.

51.7 gms. ($\frac{1}{10}$ mol.) of tetra-brom-o-sulfo-benzoic acid (or the corresponding amount of its anhydride) are heated with about 50 gm. of phenol at 130–140° C. in an oil bath for several hours until the mass becomes viscous. The melt is poured into water and the excess phenol is removed by steam distillation. The resulting dye is then dissolved in $Na_2CO_3$ solution, filtered, precipitated with acid, and crystallized from benzene or other solvents. It has the formula:

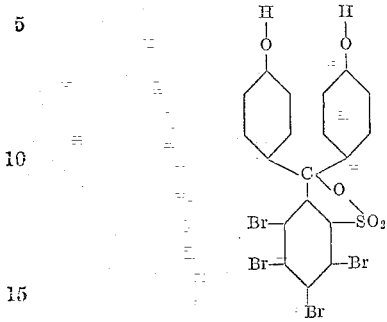

The sodium salt can be made by dissolving in a calculated amount of sodium hydroxide solution and evaporating to dryness. Other alkali salts can be prepared in the same manner.

The analogous resorcinol and cresol derivatives can be produced in the same manner.

*Example II.*—Preparation of phenol di-iodo sulphone phthalein.

45.3 gms. ($\frac{1}{10}$ mol.) of di-iodo o-sulfo benzoic acid (or the corresponding amount of anhydride) are heated with 50 gms. of phenol in an oil bath at 160°–170° C. for several hours. The melt is poured into water and the excess phenol removed by steam distillation. The resulting dye is then dissolved in $Na_2CO_3$ solution and the solution filtered. The dye is then precipitated with strong acid and crystallized from benzene, glacial acetic acid, or other solvents.

It corresponds to the probable formula:

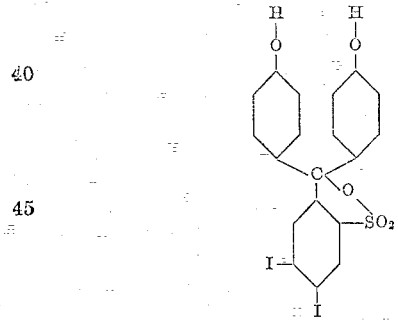

The position of the halogen atoms is not definitely known and therefore I do not wish to be limited to the particular positions shown.

The sodium salt can be made by dissolving in a calculated amount of sodium hydroxide solution and evaporating to dryness.

The resorcinol and cresol derivatives can be made after this scheme.

*Example III.*—Preparation of di-chloro phenol tetra-iodo sulphone phthalein.

70.6 gms. ($\frac{1}{10}$ mol.) of tetra-iodo o-sulfobenzoic acid (or a corresponding amount of its anhydride) and 70 gms. of o-chloro-phenol are condensed by heating in an oil bath at 130°–170° C. for several hours. The melt is poured into water, and excess phenol is removed by steam distillation. The dye is purified by dissolving in $Na_2CO_3$ solution, filtering, precipitating with strong acid, and crystallizing from benzene, glacial acetic acid, or other solvents.

It has the probable formula:

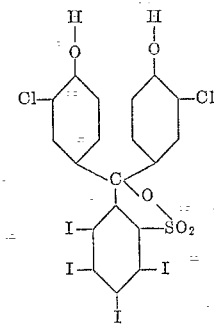

The sodium salt can be made by solution in a calculated amount of sodium hydroxide and evaporating to dryness. Other alkali salts can be made in a similar manner.

*Example IV.*—Preparation of di-iodo resorcinol, tetra-iodo sulphone phthalein by direct halogenation.

87.1 gms. ($\frac{1}{10}$ mol.) of resorcinol tetra-iodo sulphone phthalein are dissolved in 200 cc. of 1 N NaOH and 500 cc. of water. 50.5 gms. of iodine dissolved in 100 cc. of water containing 50 gms. of potassium iodide are added with rapid stirring to the solution of the dye and enough $Na_2CO_3$ (15 gms.) is added to neutralize the hydriodic acid formed. The reaction mixture is allowed to stand at room temperature for several hours until a test portion shows no trace of free iodine. The iodinated dye is then precipitated with strong acid. Purification is accomplished by solution in $Na_2CO_3$ solution, filtering and re-precipitating. It probably has the formula:

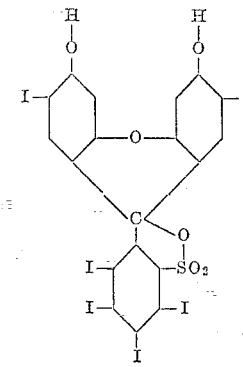

The sodium salt is prepared by solution in a calculated amount of sodium hydroxide and evaporating the solution to dryness.

In place of the resorcinol tetra-iodo sulphone phthalein used in this example, molal proportions of resorcinol tetra-chlor and tetra-brom sulphone phthalein may be used. The products are then di-iodo resorcinal tetra-chlor sulphone phthalein and di-iodo resorcinal tetra-brom sulphone phthalein.

*Example V.*—Preparation of tetra-brom phenol tetra-iodo sulphone phthalein by direct halogenation.

85.7 gms. ($\frac{1}{10}$ mol.) of phenol tetra-iodo sulphone phthalein are dissolved in 200 cc. of glacial acetic acid and 62.2 gms, of bromine dissolved in glacial acetic acid are added. The bromination takes place at room temperature. After standing over night crystals of tetra-brom phenol tetra-iodo sulphone phthalein separate out. The filtrate is poured into water and the amorphous product is recrystallized from glacial acetic acid. It probably corresponds to the formula:

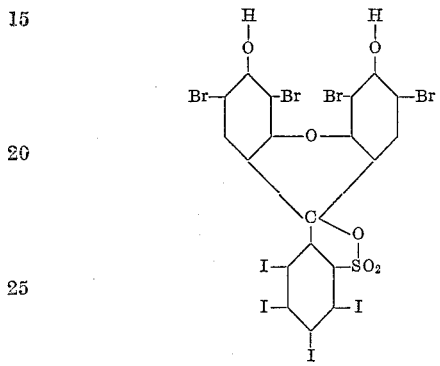

The sodium salt of the dye can be made by dissolving in a calculated amount of sodium hydroxide and evaporating to dryness.

Phenol tetra-iodo sulphone phthalein may be iodinated in a like manner and tetra-iodo phenol tetra-iodo sulphone phthalein obtained.

In place of phenol tetra-iodo sulphone phthalein, phenol tetra-chlor and tetra-brom sulphone phthalein and resorcinol tetra-chlor, tetra-brom and tetra-iodo sulphone phthalein can be used and the corresponding derivatives obtained.

If the reaction temperature is kept at 0° C. and the calculated quantity of bromine added, the di-brom phenol derivatives of these halogenated sulphone phthaleins may be obtained. The extent of halogenation depends to a certain extent upon the temperature, but depends primarily upon the amount of halogen used and the length of time of the reaction.

In the appended claims by the term "halogenated ortho-sulfo-benzoic acid compound" I wish to include the anhydride of halogenated ortho-sulfo-benzoic acid as well as the free acid.

I claim:

1. As a new product, a halogenated sulphone phthalein in which halogen is present in the sulfo-benzoic acid nucleus.

2. As a new product, a polyhalogenated sulphone phthalein in which halogen is present in both the sulfo-benzoic acid and phenolic nuclei.

3. As a new product a polyhalogenated sulphone phthalein in which halogen is present in the sulfo-benzoic acid nucleus.

4. As a new product, an iodinated sulphone phthalein in which iodine is present in the sulfo-benzoic acid nucleus.

5. As a new product, a polyiodinated sulphone phthalein in which iodine is present in the sulfo-benzoic acid nucleus.

6. As a new product, a polyiodinated sulphone phthalein in which iodine is present in both the sulfo-benzoic acid and phenolic nuclei.

7. As a new product, a polyiodinated sulphone phthalein having at least two iodine atoms in the sulfo-benzoic acid nucleus and at least one iodine atom in each of the phenolic nuclei.

8. As a new product, a halogenated sulphone phthalein having the formula:

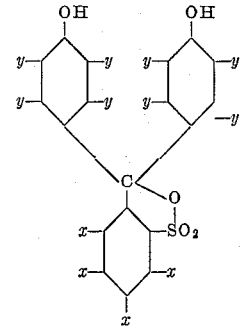

wherein $x$ stands for hydrogen or a halogen, at least one $x$ being a halogen, and $y$ stands for hydrogen or a halogen.

9. As a new product a halogenated sulphone phthalein having the formula:

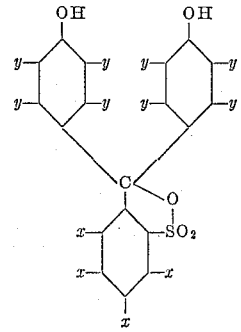

wherein $x$ stands for hydrogen or a halogen, at least two $x$'s being halogen and $y$ stands for hydrogen or a halogen.

10. As a new product a halogenated sulphone phthalein having the formula:

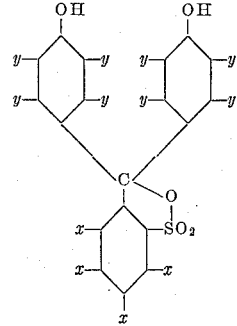

wherein $x$ stands for hydrogen or a halogen, at least two $x$'s being halogen, and $y$ stands for hydrogen or a halogen, at least one $y$ in each phenolic nucleus being halogen.

11. As a new product an iodinated sulphone phthalein having the formula:

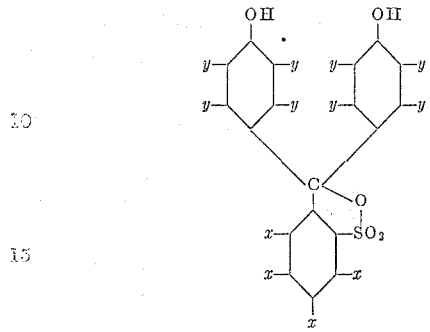

wherein $x$ stands for hydrogen or iodine, at least one $x$ being iodine, and $y$ stands for hydrogen or iodine.

12. As a new product an iodinated sulphone phthalein having the formula:

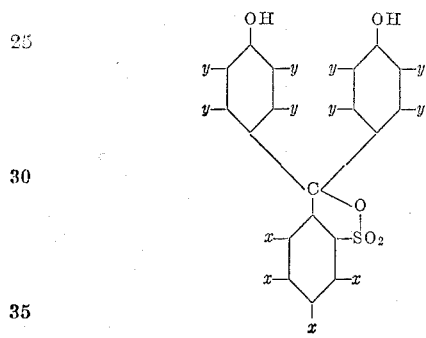

wherein $x$ stands for hydrogen or iodine, at least two $x$'s being iodine, and $y$ stands for hydrogen or iodine.

13. Tetra-iodo phenol tetra-iodo sulphone phthalein.

14. Process for preparing halogenated sulphone phthaleins which comprises condensing a halogenated ortho-sulfo-benzoic acid with a phenol.

15. Process for preparing halogenated sulphone phthaleins which comprises heating a halogenated ortho-sulfo-benzoic acid with a phenol at temperatures between about 120°–170° C.

16. Process for preparing halogenated sulphone phthaleins which comprises heating a halogenated ortho-sulfo-benzoic acid with a phenol at temperatures between about 120°–170° C. and halogenating the resulting compound directly.

17. Process for preparing halogenated sulphone phthaleins which comprises subjecting a sulphone phthalein containing halogen in the sulfo-benzoic acid nucleus to direct halogenation.

In testimony whereof I affix my signature.

WILTON C. HARDEN.